(12) United States Patent
Bergström

(10) Patent No.: US 9,932,095 B2
(45) Date of Patent: Apr. 3, 2018

(54) ASSEMBLY OF FLOATABLE MODULES

(71) Applicant: Aquavilla Produktion AB, Västervik (SE)

(72) Inventor: Richard Bergström, Solna (SE)

(73) Assignee: Aquavilla Produktion AB, Västervik (SE)

( * ) Notice: Subject to any disclaimer, the term of this patent is extended or adjusted under 35 U.S.C. 154(b) by 178 days.

(21) Appl. No.: 14/908,385

(22) PCT Filed: Jul. 4, 2014

(86) PCT No.: PCT/SE2014/000096
§ 371 (c)(1),
(2) Date: Jan. 28, 2016

(87) PCT Pub. No.: WO2015/016759
PCT Pub. Date: Feb. 5, 2015

(65) Prior Publication Data
US 2016/0185429 A1    Jun. 30, 2016

(30) Foreign Application Priority Data

Jul. 29, 2013 (SE) ...................................... 1350918

(51) Int. Cl.
*B63B 35/08* (2006.01)
*B63B 35/38* (2006.01)
(Continued)

(52) U.S. Cl.
CPC ................ *B63B 35/38* (2013.01); *B63B 1/40* (2013.01); *B63B 3/08* (2013.01); *Y02T 70/125* (2013.01)

(58) Field of Classification Search
CPC ................................. B63B 35/38; B63B 35/08
(Continued)

(56) References Cited

U.S. PATENT DOCUMENTS 2,715,380 A * 8/1955 Archer .................. B63B 35/665
114/352
3,073,271 A * 1/1963 Brill ........................ B63B 35/38
114/266
(Continued)

FOREIGN PATENT DOCUMENTS

DE          101 42 447 A1     4/2003
KR          2010-0071237 A    6/2010

*Primary Examiner* — Lars A Olson
*Assistant Examiner* — Jovon Hayes
(74) *Attorney, Agent, or Firm* — Blank Rome LLP

(57) ABSTRACT

An assembly (3) comprising at least a first module (1) and a second module (2) with respective longitudinal axes (5) is described. Each one of the modules (1, 2) comprises a connection side (6, 7, 8, 9) which is facing the other module (1, 2) and is arranged between the upper side (6, 7, 8, 9) and the underside (20, 42), and at least two elongated bendable members (12) which connects the first module (1) with the second module (2). The first module (1) comprises at least a first connection side (6) which comprises a first recess (13) which is a part of a rotationally symmetrical form with a symmetry axis (43) which is parallel with the connection side (6). The assembly (3) comprises at least a first connection member (17), which comprises an inelastic member (22) and a longitudinal axis (35) which is parallel with the symmetry axis (43), and which is in engagement with and rotatable around the symmetry axis (43) in relation to the first recess (13).

19 Claims, 10 Drawing Sheets

(51) Int. Cl.
*B63B 1/40* (2006.01)
*B63B 3/08* (2006.01)

(58) Field of Classification Search
USPC .......................................... 114/266
See application file for complete search history.

(56) References Cited

U.S. PATENT DOCUMENTS

| | | | |
|---|---|---|---|
| 3,370,564 A | | 2/1968 | Archer et al. |
| 3,922,993 A | * | 12/1975 | Bludworth .............. B63B 35/70 |
| | | | 114/248 |
| 4,321,882 A | * | 3/1982 | Sluys ...................... E02B 3/064 |
| | | | 114/266 |
| 6,431,099 B1 | | 8/2002 | Huang |
| 2008/0092792 A1 | * | 4/2008 | Keck ......................... B63B 1/38 |
| | | | 114/61.1 |
| 2008/0115992 A1 | | 5/2008 | Scher et al. |
| 2010/0282155 A1 | * | 11/2010 | Mattson .................... B63B 3/08 |
| | | | 114/266 |
| 2016/0185429 A1 | * | 6/2016 | Bergstram ................ B63B 1/40 |
| | | | 114/266 |

* cited by examiner

ASSEMBLY OF FLOATABLE MODULES

TECHNICAL FIELD

The present invention relates to an assembly of floatable modules and a method for connecting floatable modules to such an assembly.

DESCRIPTION OF THE PRIOR ART

Piers may be produced in a large number of different ways depending on what the pier is to be used for. Traditionally piers have been built as stone structures, concrete structures, piled structures and steel structures which gives a strong pier which withstands high loads from big ships and associated heavy loads. In some cases it is not possible to build piers in a traditional way, as for instance when the water depth is to large. In other cases it might be too costly to make a traditional pier. One alternative to building piers with traditional methods is to make piers using floatable modules such as modules or caissons which are anchored to the sea floor and/or to land and are connected in a suitable length. It is previously known to connect modules with wires or chains with rubber elements between the modules.

U.S. Pat. No. 4,321,882 describes connection system for marine floating members and is directed towards solving the problems that previously known systems cannot handle large waves or allows sufficient movement between the floating members. The solution consist in arranging resilient elements in cavities in the floating bodies and in that chains extend through the floating bodies and the resilient elements. The resilient elements may comprise a steel pipe with rubber around or be entirely made of rubber. The resilient elements may be cylindrical and arranged parallelly with the chains or wires that connect the floating members.

US2010282155 is closest to the invention. D1 relates to a connection system for floating modules. Opposed socket members are arranged projecting from adjacent floating modules so that the first socket members on one of the floating modules fits in the second socket members on the other floating module. Resilient members are arranged in the first socket members. Wires extend through the entire length of the modules and through the socket members and the resilient members. The problem that is intended to be solved is that previously known connection system do not allow sufficiently large rotational movement during large waves and that the resilient members are destroyed over time due to their exposure to sunlight. The resilient members are designed as cylinders which are arranged with their longitudinal axes parallel to the wires.

A problem that has been observed with piers consisting of connected floating elements is that the wires and/or the floating elements are subject to large strains when the rubber elements between the floating elements are compressed and then expand. This may lead to strong pulls in the wires and may lead to damage or breakage of the wires and/or the floating elements.

SUMMARY OF THE INVENTION

An object of the present invention is to provide an assembly of floatable modules which are connected to each other, which assembly is an alternative to assemblies according to the prior art.

A further object of the present invention is to provide an assembly of floatable modules which are connected with flexible elements, which assembly solves the problem with an excessive deformation of resilient elements between modules which are connected to a pier.

Another object of the present invention is to provide an assembly of floatable modules which are connected with flexible members, which assembly solves the problem with overloading in the flexible members or the floatable modules due to the pulls that arise during deformation of resilient elements between the floatable modules.

A further object of the present invention is to provide a method for production of an assembly of floatable modules which assembly solves at least one of the problems mentioned above.

A further object of the present invention is to provide an assembly of floatable modules which are connected sufficiently rigidly to eliminate the risk of pinching.

At least one of these objects are achieved with an assembly of floatable modules and a method according to the independent claims.

Additional advantages of the invention are provided with the features in the dependent claims.

According to a first aspect of the present invention an assembly of floatable modules is provided which comprises at least a first module and a second module each having a longitudinal axis. Each one of the modules comprises an upper side and an underside arranged to be facing upwards and downwards, respectively, when the module floats on water, and at least a first connection side which is facing the other module and is arranged between the upper side and the underside. The assembly also comprises at least two elongated flexible members which connect the first module with the second module. The assembly is characterized in that the first connection side of the first module comprises at least a first recess which is part of a rotationally symmetrical form with a symmetry axis which is parallel with the connection side. The assembly is further characterized in that the assembly comprises at least a first connection member, which comprises an inelastic member and a longitudinal axis which is parallel with the symmetry axis, and which is in engagement with and rotatable around the symmetry axis in relation to the first recess. The assembly is also characterized in that the second module comprises a connection side which is in engagement with said at least one connection member, wherein the first module is rotatable in relation to the second module in that the connection member is rotatable in relation to the recess.

With an assembly according to the invention the advantage is provided that the connection members cannot be deformed to any appreciable extent which contributes to that the elongated flexible elements are not subject to as large pulls during deformation of the elongated flexible elements as in the case with assemblies according to the prior art. By the connection members also being arranged rotatable in relation to the recess in at least one of the modules around an axis which is parallel with the connection side a joint is provided around which the modules may rotate. This contributes to the modules being able to follow the waves better.

An assembly according to the invention can withstand waves and wind considerably better than floating piers according to the prior art.

The modules in the assembly are thus floatable and may float on water.

The recesses being rotational symmetrical means that they may have any one of many different forms. The recesses may thus for example be part of a conical shape or a part of a spool-shape.

The modules which are part of the assembly may be modules which together form a pier, but may also comprise other floatable modules such as floatable buildings. Such floatable buildings are preferably connected to a floatable pier in the same way as the modules in the floatable pier are connected to each other. The modules in the assembly may weigh anything from a few tonnes to thousands of tonnes and have a length from a few meters to more than a hundred meters. The assembly may thus comprise a module which constitutes a pier and a module which constitutes a floatable building.

The floatable modules may be caissons or pontoones and the assembly may comprise caissons both caissons and pontoones. With pontoones is meant floating modules with at least one float of cellular plastic.

The assembly may be designed so that the connection side of the second module comprises at least a first recess with the same shape around a symmetry axis as the first recess in the first module and wherein the first connection member is in engagement with said at least first recess in the second module. With the modules designed in this way the connection member is thus rotatable in relation to both modules between which the connection member is arranged. In this way the modules may be made symmetrical with two opposite connection sides with the same design. A further advantage is that the rotation of the connection member in relation to each one of the modules becomes less than it is in the case that the connection member is only rotatable in relation to one of the modules.

Furthermore, it is advantageous to not have the connection member removably attached to any one of the modules as it then becomes easier to connect an assembly.

An alternative is to let the connection member comprise an inelastic member which constitutes an integrated part of the second module. Such a connection member may easily be manufactured with the second module.

The connection member may have a length from a few decimeters up to a few meters. Preferably, the connection member has a length in the interval 0.3 m to 10 m.

The connection member may have a diameter transverse the length axis of a few decimeters up to a few meters. Preferably, the connection member has a diameter transverse the length axis in the interval 1 dm to 2 m.

Thus, the recesses have a form which is partly rotational symmetrical around the same symmetry axis.

The connection sides of the modules may be essentially perpendicular to the longitudinal axes of the modules. This is preferable in that the movement of the assembly in waves then becomes easy to model and consequently also the dimensioning of the assembly becomes easier.

The flexible members may be wires and preferably steel wires. This is advantageous in that they are inexpensive and strong and may be designed with a relatively small total cross section. As an alternative to wires synthetic cords may be used. There is a large number of different cords on the market with high strength. For example there exist cords which are used as halyards and sheets in sail ships, which cords have a higher strength per surface area than steel. A drawback with such cords is that they are more expensive than wires. It is also possible within the scope of the invention to use chains. A drawback with chains is however that the total cross section of a chain becomes larger than for an equally strong wire.

The assembly may comprise at least two connection members, and a first and a second recess on each connection side. With two connection members an even load may be provided in that the connection members then may be placed with a connection member on each side of the center of the module. It is of course possible to have an arbitrary number of connection members in an assembly according to the invention. However, the cost for the connection members is minimized with a small number of connection members.

The assembly may be designed so that the recesses in the modules essentially has the shape of a part of a cylinder and the parts of the connection member which are in engagement with the recesses have the shape of parts of cylinders. A cylinder is the shape that is easiest and thereby least expensive to produce.

The inelastic member may, on the surfaces facing the recesses, be covered with a contact layer for provision of low friction between the connection member and the recesses. By arrangement of such a layer the choice of material in the inelastic member becomes easier as only strength properties then has to be taken into consideration while desired frictional properties and sound properties are provided by the contact layer.

As an alternative to arranging the contact layer on the inelastic member the contact layer may be arranged in the recesses.

The material in the contact layer may be chosen from the group consisting of: plastic, Teflon and rubber. These materials have good acoustical properties at the same time as they provide low friction.

The contact layer preferably has a thickness which is no more than 10%, and preferably no more than 5%, of the largest extension of the inelastic member transverse to the length axis. With such a maximum extension any elasticity of the contact layer will only affect the elasticity properties of the connection member to a limited extent.

With an inelastic member is here meant an element which has a capacity for inelastic deformation of no more than 0.2% and preferably no more than 0.1%. Such an elasticity is provided with, inter alia, steel tubes. Is is thus not desirable to have a large capacity for elastic deformation in the inelastic member.

The inelastic member may comprise a tube. Alternatively, the inelastic member may be a homogeneous shaft. However, it may be expensive to provide a homogeneous shaft. In order to provide sufficient strength of the inelastic member in the form of a tube the tube may be filled with concrete. Concrete has a high strength against compression strain and is relatively inexpensive.

In the case that the inelastic member is a tube it may be of metal and preferably of steel even if other metals also may be used. An inelastic member in the form of a tube may also be manufactured of plastic.

In the case that the inelastic member is homogeneous it may be manufactured of plastic or wood. An inelastic member of plastic or wood may be made considerably lighter than an element made of steel and concrete. In the case of plastic it might be fibre-reinforced.

The bendable members may be arranged to extend in through holes in said at least one connection member. Then they extend transverse to the longitudinal axis of the connection member. The number of bendable members per connection member may be different depending on the size of the connection member and the size of the floatable modules. Preferably, the number of bendable elements per connection unit is in the interval 1-10.

The tube may comprise transverse tubes through which the bendable members extend. The transverse tubes are preferably attached to the tube and in the case that the tube is filled with concrete the transverse tubes act as reinforcement.

Each module preferably comprise two parallel connection sides for connection to other modules. The modules may then be made symmetrical and be connected to long assemblies.

The assembly may be arranged so that when the assembly floats on water the symmetry axes of the recesses are parallel with the water surface. This is advantageous in that the modules then turn in a natural plane.

Preferably, a set of bendable members are arranged for each pair of modules so that each set of bendable members only connect two modules.

According to a second aspect of the present invention a method is provided for connection of modules to an assembly, wherein each one of the modules comprises a longitudinal axis, an upper side and an under side arranged to be facing upwards and downwards, respectively, when the module floats on water, and at least one connection side which is facing the other module and is arranged between the upper side and the underside. The method comprises the steps of connecting at least a first module and a second module with at least two elongated bendable members. The method is characterized in the steps of providing on at least the connection side of the first module at least a first recess which is a part of a rotationally symmetrical form with a symmetry axis which is parallel with the connection side, and to arrange at least a first connection member, which comprises an inelastic shaft, in engagement with play with said at least one first recess. The method is also characterized by the step of arranging said at least first connection member in engagement with the connection side of the second module, wherein the first module is rotatable in relation to the second module by the connection member being rotatable in relation to the recess around the symmetry axis.

The advantages with the method are the same as has been described in relation to the assembly according to the first aspect of the invention.

According to a third aspect of the present invention an assembly is provided comprising at least a first module and a second module, each having a respective longitudinal axis, wherein each one of the modules comprises an upper side and an underside arranged to be turned upwards and downwards, respectively, when the module floats on water, and at least a first connection side which is facing the second module and is arranged between the upper side and the underside. The assembly also comprises at least two elongated bendable members arranged to connect the first module with the second module. The assembly is characterized in that the first connection side of the first module comprises at least a first recess which is a part of a rotationally symmetrical form with a symmetry axis which is parallel to the connection side, and in that the assembly comprises at least a first connection member, which comprises an inelastic member and a longitudinal axis which is parallel with the symmetry axis, and is arranged to be arranged in engagement with the first recess and the connection side of the second module.

An assembly according to the third aspect of the present invention may be assembled to an assembly according to the first aspect of the present invention.

The features above may be combined in the same embodiment to the extent that they are not alternatives to each other. In the following preferred embodiments of the invention will be described with reference to the appended drawings.

SHORT DESCRIPTION OF THE DRAWINGS

DESCRIPTION OF PREFERRED EMBODIMENTS

Figure 1:
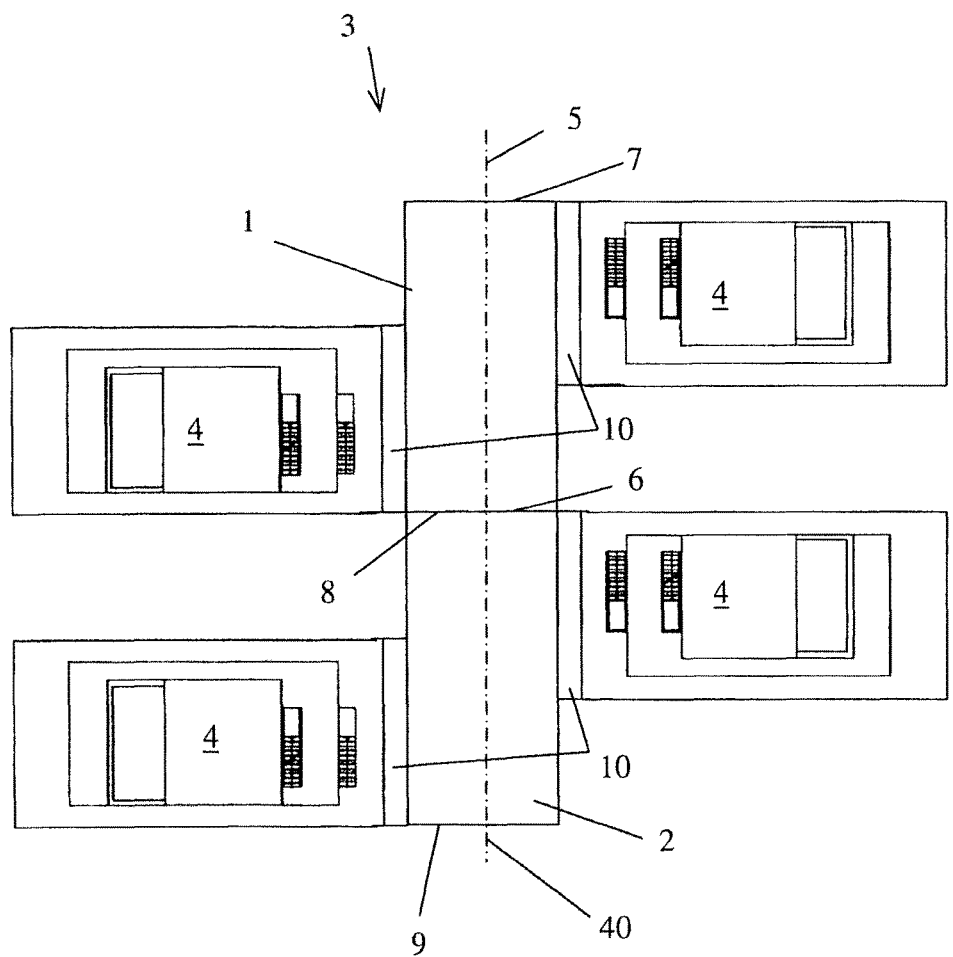
FIG. 1 shows two modules which are connected to an assembly with a floatable building connected to each module.

In the following description of preferred embodiments the same feature in the different drawings will be denoted with the same reference numeral. It should be noted that the drawings are not to scale.

In the following description the expression metal profile will be used for the cut-off pieces of the bent sheet metal.

FIG. 1 shows a first module 1 and a second module 2 which are connected to an assembly 3 with a floatable building 4 connected to each module 1, 2. Each one of the modules 1, 2, has a respective longitudinal axis 5, 40, which in the shown embodiment coincides with each other and therefore have been given the same reference numeral. The first module 1 has a first connection side 6 and a second connection side 7, which are arranged on opposite sides of the first module perpendicular to the longitudinal axis 5, 40. The second module 2 has a first connection side 8 and a second connection side 9, which are arranged perpendicular to the longitudinal axis 5, 40. The first module 1 is connected with the second module 2 with the first connection side 6 on the first module 1 facing the first connection side 8 on the second module 2. It is of course possible to connect more than two modules after each other. It is of course also possible to have the connection sides at an angle in relation to the longitudinal axis 5, 40, and to have the longitudinal axes 5, 40, for the different modules at an angle in relation to each other. From each module 1, 2, rectangular protrusions 10 protrude, to which the floatable buildings 4 are connected. The floatable buildings 4 also constitute floatable modules and are preferably connected to the first module 1 and the second module 2 in the same way as the first module 1 and the second module 2 are connected to each other.

Figure 2:
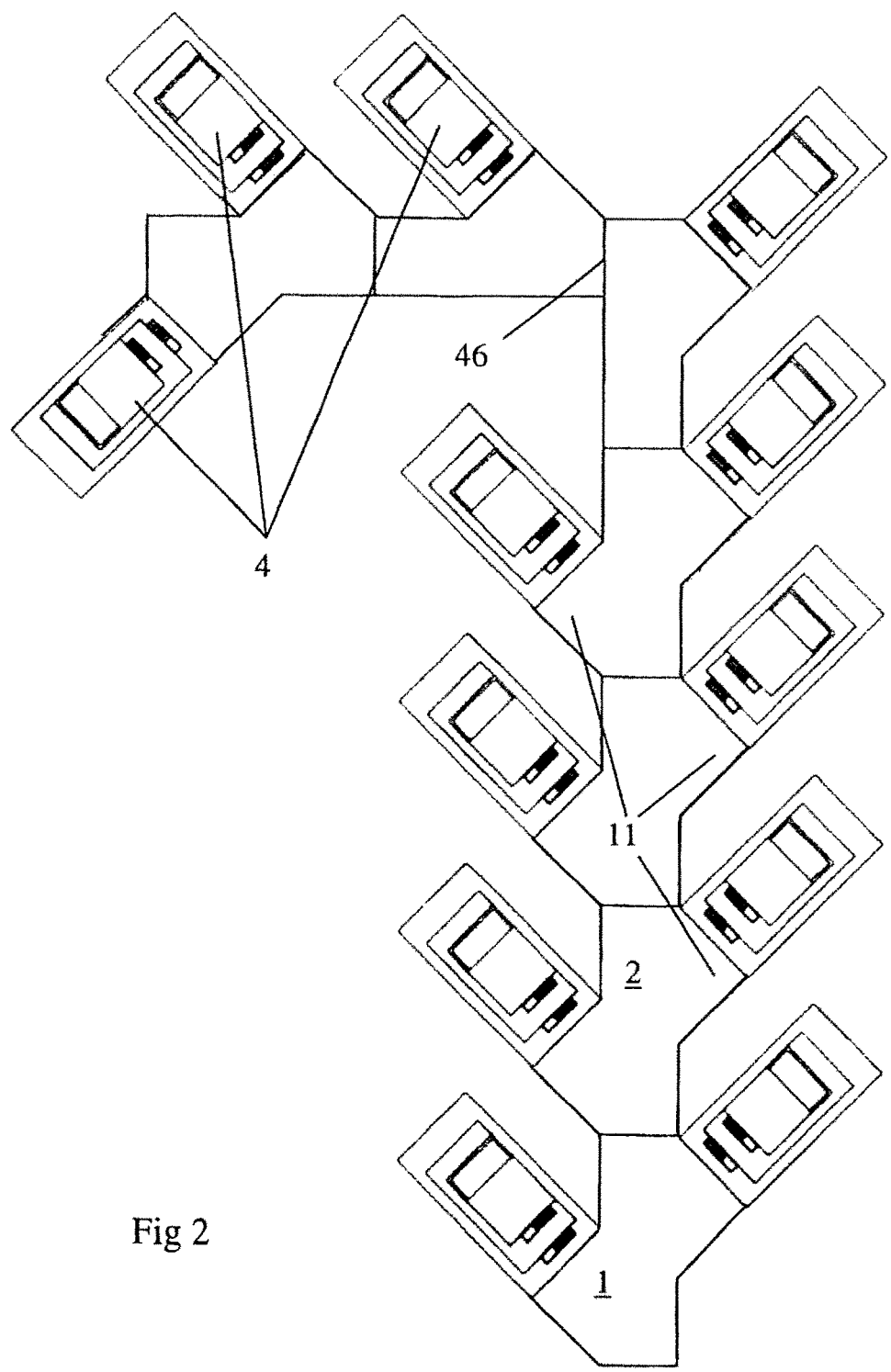
FIG. 2 shows two modules according to an alternative embodiment of the invention connected to an assembly.

FIG. 2 shows a first module 1, and a second module 2, connected together with a plurality of other modules 45 to an L-formed pier, and connected with floatable buildings 4 connected to the modules 1, 2, 45, to an assembly. In contrast to the embodiment shown in FIG. 1 the modules have triangular protrusions 11 so that the floatable buildings 4 are positioned at an oblique angle in relation to the modules 1, 2. Most of the modules 1, 2, 45, are connected to each other along connection sides which are parallel to each other 6-9 and perpendicular to the longitudinal axis 5 similarly to the embodiment in FIG. 1. However, a connection side 46 which is arranged parallel to the longitudinal axis 5 is shown, which enables the L-form of the pier.

Figure 3:
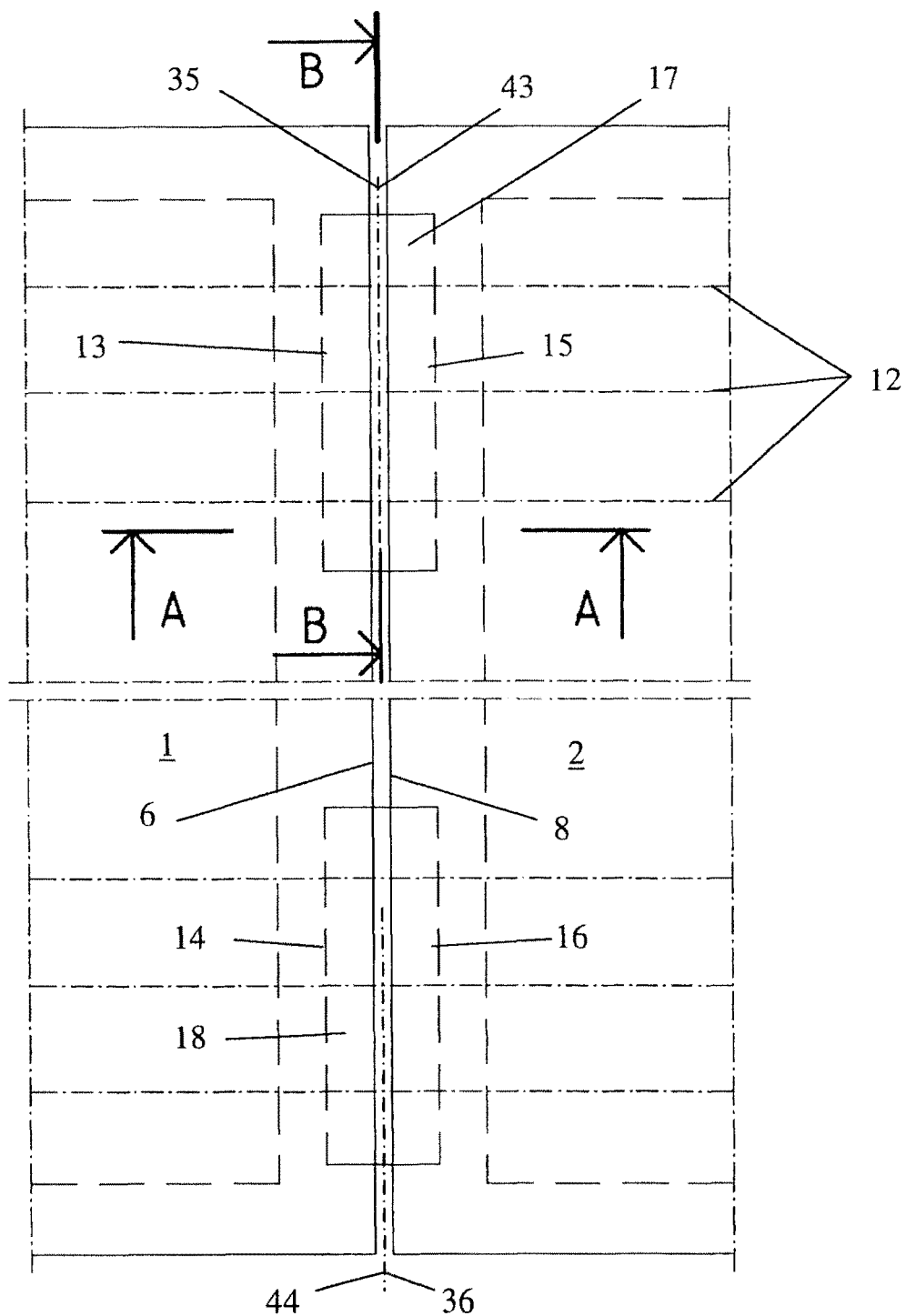
FIG. 3 shows in larger detail in cross section from above the joint between two modules.

FIG. 3 shows in larger detail in cross section from above the joint between the two modules 1, 2, in FIG. 1 or FIG. 2. The first connection side 6 of the first module 1 is connected to the first connection side 8 of the second module 2 by means of elongated bendable members 12 in the form of pretension wires which extend between the modules. In the first connection side 6 on the first module 1 there is arranged a first recess 13 and a second recess 14. In the corresponding way there is arranged a first recess 15 and a second recess 16 in the first connection side 8 of the second module. A first connection member 17 is arranged between the first module 1 and the second module 2 in engagement with the first recesses 13, 15. A second connection member 18 is arranged between the first module 1 and the second module 2 in engagement with the second recesses 14, 16. The elongated bendable members 12 extend through the connection members 17, 18. As is evident from FIG. 3 the modules 1, 2, are arranged at a distance from each other in order to avoid that the modules 1, 2, hit each other. The recesses 13, 15, are designed as a part of a rotationally symmetrical form with a symmetry axis 21 being parallel with the connection sides 6, 7. In the shown embodiment the connection members 17, 18, are cylindrically shaped with longitudinal axes 35, 36, which are also symmetry axes 43, 44 for the recesses. The longitudinal axes 35, 36, are parallel with the water surface on which the assembly floats.

Figure 4:
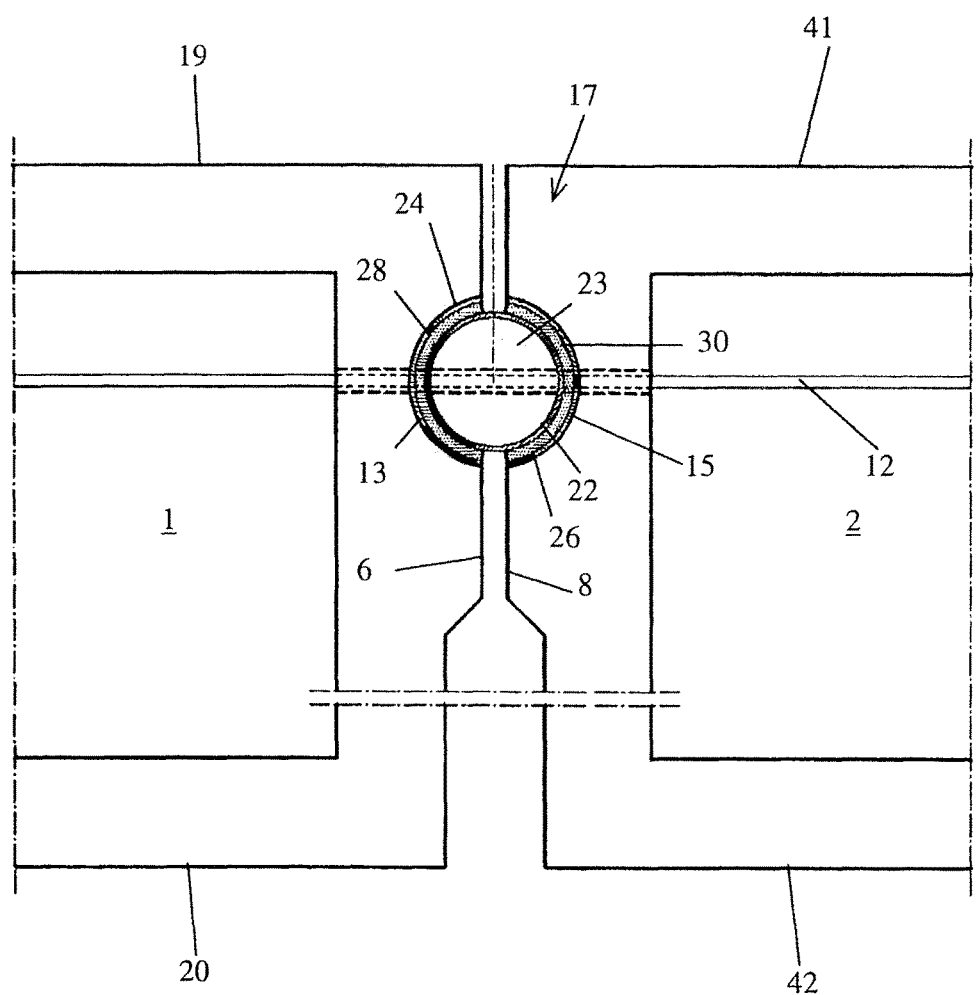
FIG. 4 shows the joint in FIG. 3 from the side in the section A-A.

FIG. 4 shows the joint in FIG. 3 from the side in the section A-A. From FIG. 4 it is evident that the modules 1, 2, comprise an upper side 19, 41, and an underside 20, 42, arranged to be facing upwards and downwards, respectively, when the modules 1, 2, float on water. The connection sides 6, 7, are arranged between the upper side 19 and the underside 20. As is evident from FIG. 4 the elongated bendable members 12 extend through the connection member 17. The recesses 13, 15, are designed as a part of a rotationally symmetrical body with a symmetry axis 21 (FIG. 3) which is parallel with the connection side. In the shown embodiment the connection members 17, 18, are cylindrical but could have a varying cross section along the longitudinal axes 35, 36, of the connection members 17, 18, (FIG. 3). As is evident from FIG. 4 the connection member 17 fills up the most of the recesses 13, 15. Preferably, the radius of curvature of the connection member 17 is somewhat smaller than the radius of curvature of the recesses 13, 15, so that the connection member 17 relatively easily may be rotated in relation to the recesses 13, 15. The connection member comprises an inelastic member in the form of a tube 22 which is filled with concrete 23. With an inelastic shaft it is avoided that the connection member is deformed appreciably when it is being subject to pressure form the modules 1, 2. The modules 1, 2, are preferably manufactured from reinforced concrete. The recesses 13, 15, are on the connection sides covered with lining layers 24, 26. The lining layers 24, 26, are preferably of steel, but may also be formed of other metals or alloys such as bronze. On the outside of the tube 22 of the connection member 17 there is arranged contact layers 28, 30, on the surfaces of the tube 22 facing the recesses 13, 15. The contact layers 28, 30, have the primary purpose of eliminating noises which could arise during rotation of the connection members 17, in relation to the recesses if there where direct contact between a connection member 17, with a steel surface and recesses 13, 15, with steel surfaces. The contact layers 28-31 may be of, inter alia, rubber, Teflon or plastic. In the case that the contact layers 28-31 are made of rubber they have a certain elasticity. However, the contact layers have a thickness which is no more than 10% of the extension of the inelastic member transverse the longitudinal axis. Preferably, the tube 22 is made of steel but could be made of a different metal. The metal tube could also be replaced with a tube of a different material such as, inter alia, fibre reinforced plastic. In the latter case it might be possible to dispense with the contact layers 28-31.

Figure 5:
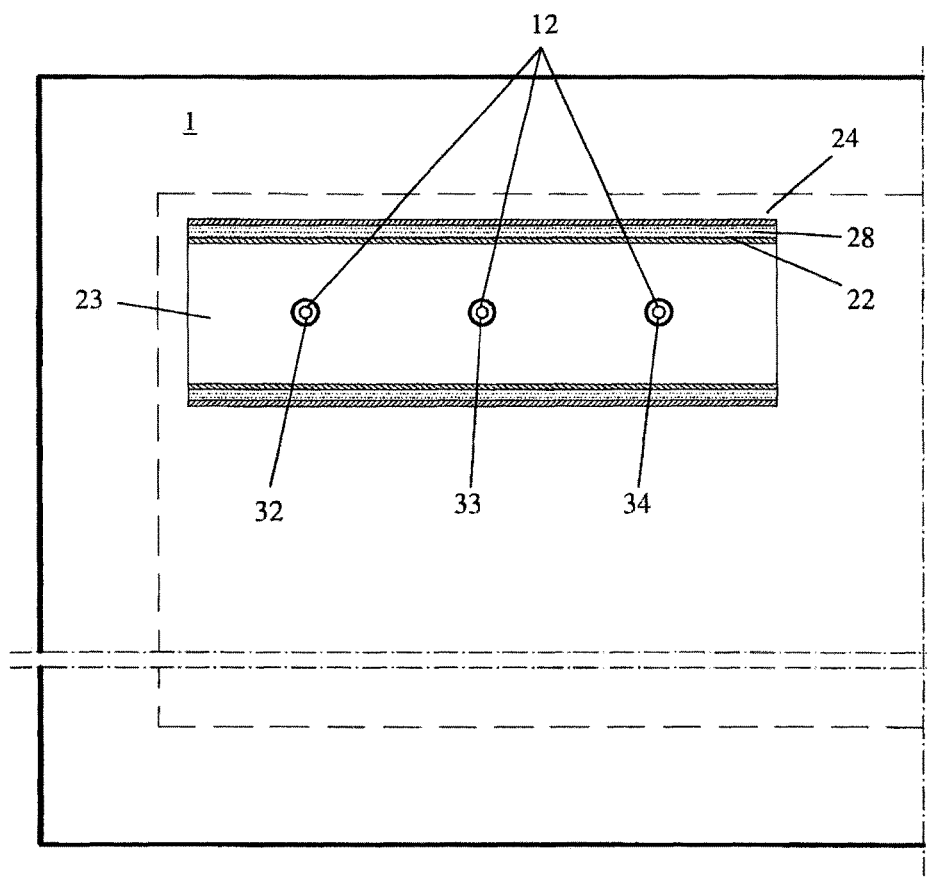
FIG. 5 shows the joint in FIG. 3 along the section B-B.

FIG. 5 shows the joint in FIG. 3 along the section B-B. Thus, in FIG. 5 the connection member 17 is shown in cross section. As is evident from FIG. 5 the connection member 17 comprises three through holes which are defined by a first, a second and a third transverse tube 32-34, which extend transverse through the tube 22. The transverse tubes are united with the tube. According to a preferred embodiment the transverse tubes 32-34 are made of steel and are welded to the tube 22 which is also made of steel. The tube 22 is filled with concrete 23, wherein the transverse tubes 32-34 constitute reinforcement for the concrete.

In this application inelastic means that the element cannot be deformed elastically more than 0.2%. Such an element may be designed in many different ways.

Figure 6:
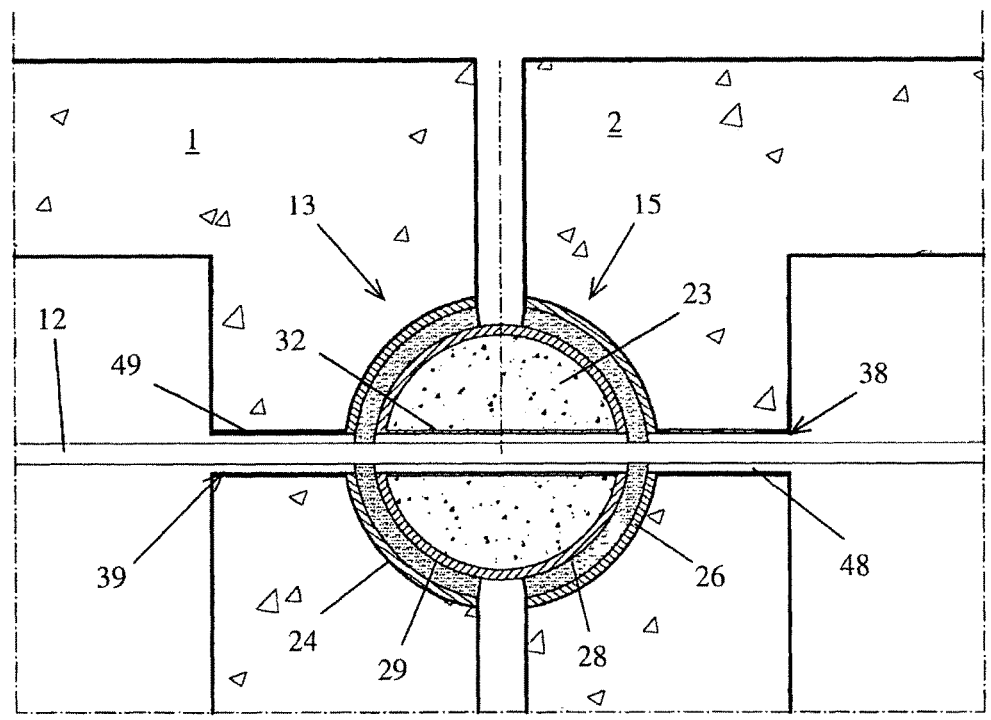
FIG. 6 shows in larger detail the joint in FIG. 4.

FIG. 6 shows in larger detail the joint in FIG. 4 in a cross section transverse the longitudinal axis of the first connection member 17 and shows the first transverse pipe 32 in cross section. As is evident from FIG. 4 and FIG. 6 the tube is cylindrical while the contact layers 28, 29, only extend around a part of the tube 22. Thus, the first connection member 17 is not cylindrical in its entirety as the contact layers 28, 29, do not cover the entire tube 22. As is evident from FIG. 6 the modules 1, 2, are constituted of reinforced concrete. The recesses 13, 15, are provided with lining layers 24, 25, of steel. The elongated bendable members extend through through holes 38, 39, in the floatable modules 1, 2, which holes are lined with tubes 48, 49.

Figure 7:
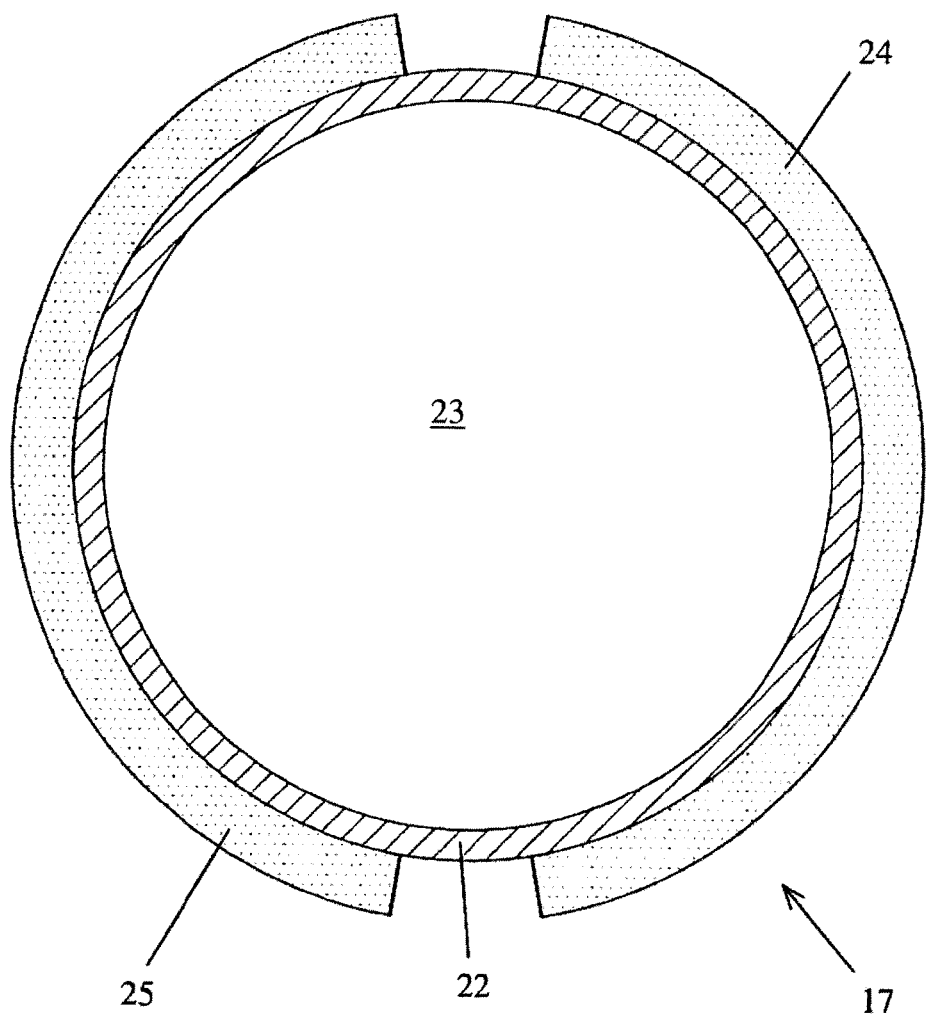
FIG. 7 shows in cross-section in larger detail the connection member in FIG. 6 in a different section.

FIG. 7 shows in cross section in larger detail the connection member in FIG. 6 in a different section. The section in FIG. 7 is taken between transverse tubes 32-34 and shows the tube 22 which is filled with concrete 23. The contact layers 28, 29, extend around a part of the tube 22. As has been mentioned above it is possible to manufacture the connection member in other ways than by filling metal tubes with concrete. It is for example possible to have the connection member made of only one material such as plastic or wood. In case the connection member is made of plastic the plastic may be fibre reinforced. The connection member being made of only one material may be a homogeneous shaft, which is also preferable if wood is chosen as material. Examples on usable woods may be ebony and oak. When the connection member is made of plastic the lining in the floating modules may be omitted.

Figure 8:
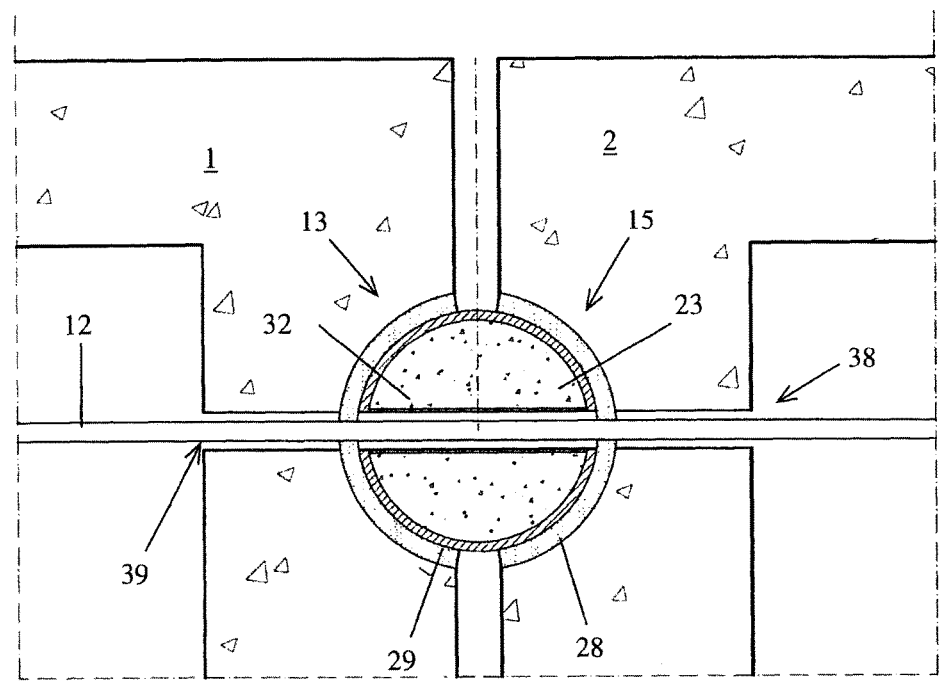
FIG. 8 shows an alternative embodiment in the same cross-section as is shown in FIG. 6.

FIG. 8 shows an alternative embodiment in the same section as is shown in FIG. 6. The difference in relation to FIG. 6 is that there are not arranged any lining layers in the recesses 13, 15, and neither any tubes in the through holes 38, 39. By the described simplification of the embodiment the manufacturing is facilitated, which then becomes less costly.

Figure 9:
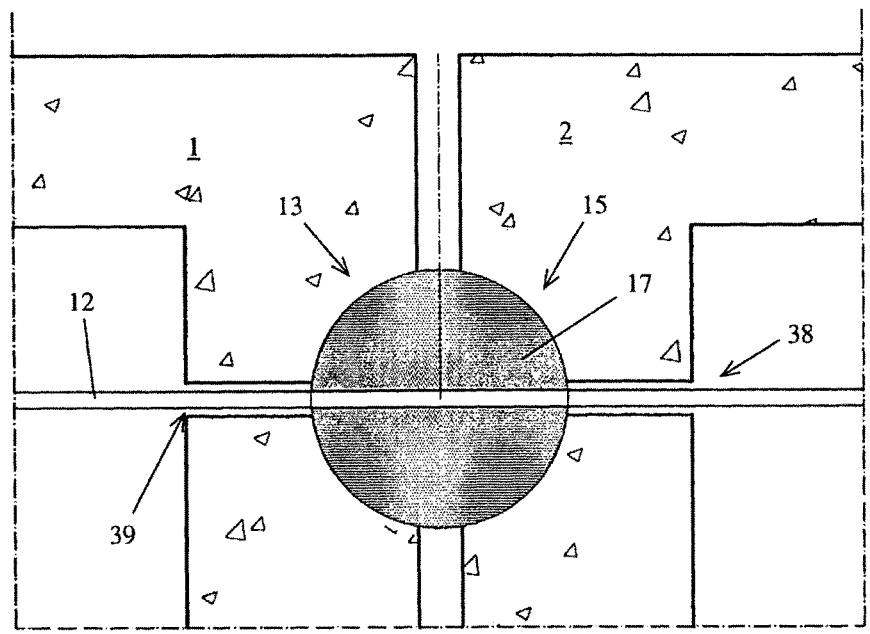
FIG. 9 shows an alternative embodiment in which the connection member only comprises a homogeneous shaft.

FIG. 9 shows an alternative embodiment in which the connection member 17 only comprises a homogeneous shaft without any contact layer and without lining layers in the recesses 13, 15. The connection member is preferably manufactured from plastic such as for example Teflon. Plastic in general and Teflon in particular has a low coefficient of friction.

Figure 10:
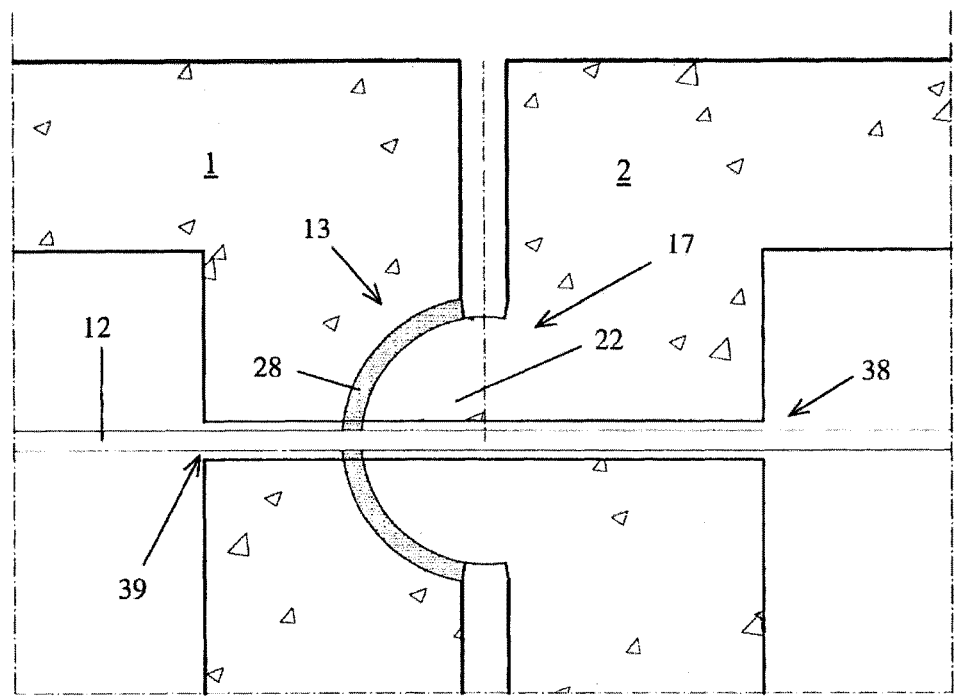
FIG. 10 shows in larger detail an alternative embodiment of the joint in FIG. 4 in cross-section.

FIG. 10 shows in larger detail an alternative design of the joint in FIG. 4 in a cross section transverse the longitudinal axis 35 of the connection member 17. As is evident from FIG. 8 the first connection member 17 is designed with a cross section in the form of a half cylinder and comprises an inelastic member 22. A contact layer 28 is arranged on the connection member 17, but could alternatively be arranged in the recess 13. As is evident from FIG. 10 the inelastic member 22 is moulded as a continuous part of the second module 2. Alternatively the inelastic member 22 could be a separate part which is fixed to the second module 2.

The described embodiments of the invention may be modified in many ways without departing from the spirit and scope of the invention which is limited only by the appended claims.

It is for example possible to have the contact layers 28-31 arranged on the lining layers 24-27 instead of on the tube 22.

It is of course possible to let each one of the bendable members connect more than two modules. It is, however, less complicated to only let them connect two modules.

The above described floatable buildings 4 may be connected in another way to each other than the first module 1 and the second module 2.

The modules may of course be provided with an arbitrary number of connection sides.

The invention claimed is:

1. Assembly comprising at least a first module and a second module with respective longitudinal axes, wherein the first and second modules are caissons or pontoons, wherein each one of the modules comprises an upper side and an underside arranged to be facing upwards and downwards, respectively, when the module floats on water, and at least a first connection side which is facing the other module and is arranged between the upper side and the underside, and at least two elongated bendable members which connect the first module with the second module, wherein:
the first connection side of the first module comprises at least one first recess which is a part of a rotationally symmetrical form with a symmetry axis which is parallel with the connection side,
the assembly comprises at least a first connection member, which comprises an inelastic member and a longitudinal axis which is parallel with the symmetry axis, and which is in engagement with and rotatable around the symmetry axis in relation to the first recess, and
the first connection side of the second module is in engagement with said at least one connection member, wherein the first module is rotatable in relation to the second module by the connection member being rotatable in relation to the first recess, and
the bendable members extend in through holes in said at least one connection member.

2. Assembly according to claim 1, wherein the connection side of the second module comprises at least a first recess with the same shape as the first recess in the first module around a symmetry axis and wherein the first connection member is in engagement with and rotatable in relation to said at least first recess in the second module.

3. Assembly according to claim 1, wherein the connection sides are essentially perpendicular to the length axis of the modules.

4. Assembly according to claim 1, wherein the bendable members are wires.

5. Assembly according to claim 1, comprising at least two connection members, and a first recess and a second recess on each connection side.

6. Assembly according to claim 1, wherein the recesses in the modules essentially has the shape of a part of a cylinder and the parts of the connection member which are in engagement with the recesses have the shapes of parts of cylinders.

7. Assembly according to claim 1, wherein the inelastic member on the surfaces facing the recesses is covered with a contact layer for providing a low friction between the connection member and the recesses.

8. Assembly according to claim 7, wherein the material in the contact layer is chosen from the group consisting of: plastic, Teflon and rubber.

9. Assembly according to claim 7, wherein the contact layer has a thickness being no more than 10% of the largest extension transverse the longitudinal axis of the inelastic member.

10. Assembly according to claim 1, wherein said inelastic member comprises a tube.

11. Assembly according to claim 10, wherein the tube is filled with concrete.

12. Assembly according to claim 10, wherein the tube is made of metal.

13. Assembly according to claim 12, wherein the metal is steel.

14. Assembly according to claim 10, wherein the tube comprises transverse tubes which define the holes and through which the bendable members extend.

15. Assembly according to claim 1, wherein each module comprises two parallel connection sides for connection to other modules.

16. Assembly according to claim 1, wherein the symmetry axes of the recesses are parallel with the water surface when the assembly floats on water.

17. Assembly according to claim 1, wherein there is arranged a set of bendable members for each pair of modules so that each bendable member only connects two modules.

18. Method for connecting modules to an assembly, which modules are caissons or pontoons, wherein each one of the modules comprises a longitudinal axis, an upper side and an underside arranged to be facing upwards and downwards, respectively, when the module floats on water, and at least one connection side which is facing the other module and is arranged between the upper side and the underside, comprising the steps of:
connecting at least a first and a second module with at least two elongated bendable members, by:
providing on at least the connection side of the first module at least a first recess which is a part of a rotationally symmetrical form with a symmetry axis which is parallel with the connection side,
arranging at least a first connection member, comprising an inelastic shaft, in engagement with and rotatable in relation to said at least one first recess, and
arranging said at least first connection member in engagement with the connection side of the second module, wherein the first module is rotatable in relation to the second module by the connection member being rotatable in relation to the recess,
providing the at least first connection member with through holes, and
arranging the bendable members to extend in the through holes in said at least one connection member.

19. Assembly comprising at least a first module and a second module with respective longitudinal axes, which modules are caissons or pontoons, wherein each one of the modules comprises an upper side and an underside arranged to be facing upwards and downwards, respectively, when the module floats on water, and at least a first connection side which is facing the other module and is arranged between the upper side and the underside, and at least two elongated bendable members intended to connect the first module with the second module, wherein:
the first connection side of the first module comprises at least a first recess which is a part of a rotationally symmetrical form with a symmetry axis which is parallel with the connection side, the assembly comprises at least a first connection member, which comprises an inelastic member and a longitudinal axis which is parallel with the symmetry axis, and is arranged to be arranged in engagement with the first recess and the first connection side of the second module, and the bendable members extend in through holes in said at least one connection member.

* * * * *